(12) United States Patent
Hoff et al.

(10) Patent No.: US 7,869,928 B2
(45) Date of Patent: Jan. 11, 2011

(54) ESTIMATING HEALTH PARAMETERS OR SYMPTOMS OF A DEGRADING SYSTEM

(75) Inventors: Thomas von Hoff, Zürich (CH); Andreas Poncet, Zürich (CH); Konrad Stadler, Unterehrendingen (CH)

(73) Assignee: ABB Research Ltd, Zurich (CH)

( * ) Notice: Subject to any disclaimer, the term of this patent is extended or adjusted under 35 U.S.C. 154(b) by 823 days.

(21) Appl. No.: 11/386,738

(22) Filed: Mar. 23, 2006

(65) Prior Publication Data
US 2006/0217870 A1    Sep. 28, 2006

(30) Foreign Application Priority Data
Mar. 24, 2005    (EP) .................................. 05405270

(51) Int. Cl.
*G06F 19/00*    (2006.01)
(52) U.S. Cl. ........................... 701/100; 702/34; 702/81; 702/85; 701/59; 701/99; 701/101
(58) Field of Classification Search .................. 701/59, 701/99, 100, 101
See application file for complete search history.

(56) References Cited
U.S. PATENT DOCUMENTS
4,215,412 A * 7/1980 Bernier et al. .............. 701/100
FOREIGN PATENT DOCUMENTS
EP    0 858 017 A2    8/1998
EP    1 103 926 A2    5/2001
EP    1 233 165 A1    8/2002
EP    1 418 481 A1    5/2004

* cited by examiner

*Primary Examiner*—Tuan C To
*Assistant Examiner*—Redhwan Mawari
(74) *Attorney, Agent, or Firm*—Buchanan Ingersoll & Rooney PC

(57) ABSTRACT

The present invention is concerned with the estimation of health parameters p(k) representing symptoms of a slowly degrading system, in particular industrial gas turbines. According to the invention, an estimation of a true health or independent parameter vector at time step k uses the estimation of the true health or parameter vector at a previous time step k−1 as a starting value for the production of a predicted health parameter vector at time step k. Based on the latter and a set of measured values of input variables of an extended model of the system, a prediction of output variables of the model is produced. This predicted model output is compared with measured values of the output variables to yield an error. From this error, a health parameter estimator in turn produces a health parameter estimate as a revision of the predicted health parameters. Preferably, the estimation of a true health or independent parameter vector at time step k includes a generalized process noise representing stochastic uncertainty and/or a-priori knowledge of an evolution of the health parameters.

11 Claims, 5 Drawing Sheets

ESTIMATING HEALTH PARAMETERS OR SYMPTOMS OF A DEGRADING SYSTEM

FIELD OF THE INVENTION

The invention relates to the field of control and instrumentation technology for turbomachines such as gas turbines or internal combustion engines. It departs from a method of determining independent parameters representing health states of a degrading system for the purpose of diagnosing a performance change as described in the preamble of claim 1.

BACKGROUND OF THE INVENTION

The goal of gas turbine performance diagnosis is to accurately detect, isolate and assess performance changes, system malfunctions and instrumentation problems. Among a number of other techniques, Gas Path Analysis (GPA) is a well established framework for estimating shifts in performance from the knowledge of measured parameters, such as power, engine speeds, temperatures, pressures or fuel flow, taken along the gas path of the turbine. Discernable shifts in these measured parameters provide the requisite information for determining the underlying shift in engine operation from a presumed reference, nominal or initial state, i.e. the degradation symptoms. GPA allows engine performance deterioration to be identified in terms of a degradation of independent parameters or system states such as thermodynamic efficiencies, flow capacities and inlet/outlet filter areas. In a subsequent diagnosis step, these degradation symptoms can be analysed, from which a maintenance action schedule to ensure economic and safe operation is deduced, or from which the remaining life of the major components is predicted. The origin of a fault affecting a given component of the gas turbine can be of various nature, such as, for example, a contamination of compressor blades, erosion of turbine blades or corrosion of machine parts. Conversely, different faults often create similar observable effects or degradation symptoms.

According to the patent application EP-A 1 233 165, a degradation state of an industrial gas turbine is determined with the aid of measurements during operation of the gas turbine. The proposed Gas Path Analysis uses a mathematical simulation or an analytical performance model of a gas turbine engine based upon component characteristics of the engine in question, such as compressor and turbine maps and including thermodynamic and aerodynamic operating behaviour of the gas turbine such as the laws of conservation of energy and mass. The model permits values of measurable output variables or dependent variables to be determined from input variables such as, for example, air inlet temperature and pressure, as well as from assumptions concerning state or independent parameters corresponding to non-measurable degradation symptoms. The output variables are, for example, pressures, mass flows and temperatures at various points in the gas path of the gas turbine, a fuel mass flow, a rotational speed and an output mechanical power. Deviations of state parameters, such as efficiencies or flow capacities, from a reference value represent symptoms of a degradation of a component of the gas turbine.

In particular, a deviation of a measured deteriorated performance y' from an iterated base-line performance is multiplied with a fault coefficient matrix, derived from a theoretical relationship between the independent parameters x and the dependent parameters y of the form y=F(x), to yield an improved estimation of the exact solution $x'=F^{-1}(y')$ and the next iterated base-line. In other words, a repeated application of linear Gas Path Analysis based on iterated base-line performance via the Newton-Raphson technique is used to approach the exact solution, i.e. the independent vector x' corresponding to the measured deteriorated performance y'.

In the patent application EP-A 1 418 481 a framework for aero gas turbine diagnosis is proposed which distinguishes between rapid deterioration due to singular system fault events and gradual deterioration due to damage accumulation of all engine components. A measurement Δ vector, comprising deviations from a reference of some gas path parameter data such as rotor speed, temperatures and pressures, reflects the effects of a multitude of possible engine/sensor system fault occurrences as well as random measurement noise. From this measurement Δ vector at a discrete time k, a total fault vector $x_k$ comprising the engine system and sensor faults as the current states is estimated within a Module Performance Analysis (MPA). Apart from a reference to statistical tests or neural networks, the estimation method is not detailed. If a rapid deterioration event is in progress, single fault or root cause isolation is performed, based on the change $\Delta\Delta_k$ in the measurement Δ vector w. r. t. the previous measurement at time k−1. Otherwise, multiple fault isolation is performed to yield an updated error vector, based on the cumulative share $Z_k^{MFI}$ of the measurement Δ vector assigned to gradual deterioration.

The different components of a gas turbine (GT), which consist mainly of the inlet nozzle, the compressor, the combustion chamber, the turbine, the cooling flow, and the outlet, all contribute—to a different extent—to the degradation of GT performance. Because a small deviation from new-and-clean conditions already results in a significant loss of performance, the problem of identifying and localizing symptoms of the overall degradation is of crucial importance.

DESCRIPTION OF THE INVENTION

It is therefore an objective of the invention to monitor the evolution of different degradation symptoms of a slowly degrading system. This objective is achieved by a method of estimating and a method of simulating health parameters representing symptoms of a slowly degrading real or simulated system according to claims 1 and 9, respectively. Further preferred embodiments are evident from the dependent patent claims.

According to the invention, an approximation of a true health or independent parameter vector at time step k uses the approximation of the true health or parameter vector at a previous time step k−1 as a starting value for the production of a predicted or simulated health parameter vector at time step k.

Based on the predicted health parameters and a set of measured values of input variables of an extended model of the system, a prediction of output variables of the model is produced. This predicted model output is compared with measured values of the output variables to yield an error. From this error, a health parameter estimator in turn produces a health parameter estimate as a revision of the predicted health parameters.

The approximation of a true health or independent parameter vector at time step k includes a generalised process noise representing stochastic uncertainty and/or a-priori knowledge of an evolution of the health parameters.

Preferentially, the slowly degrading system is an industrial gas turbine that operates in a steady state for long periods of time. Correspondingly, with the exception of some rare transient phases between two distinct operating points, the temperature sensors are in thermodynamic equilibrium with the gaseous media and produce trustful measurement values. In addition, the average update interval between two successive time steps can be chosen quite long without approaching the characteristic degradation times of the turbine.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Albeit it is apparent to those skilled in the art that the present invention can be beneficially applied to a multitude of slowly degrading systems such as all kinds of turbomachines and internal combustion engines subject to ageing, frictional wear, contamination by deposits or the like, the following detailed description will concentrate on industrial gas turbines. Industrial gas turbines are particularly suited for the proposed estimation of health parameters because, unlike e.g. aero gas turbines, they are immobile and operate in a steady state for long periods of time. Therefore, neither abruptly changing ambient parameters as experienced by moving turbines, nor imbalanced exhaust parameters following an acceleration phase, are generally to be expected in the case of industrial gas turbines.

Figure 1:
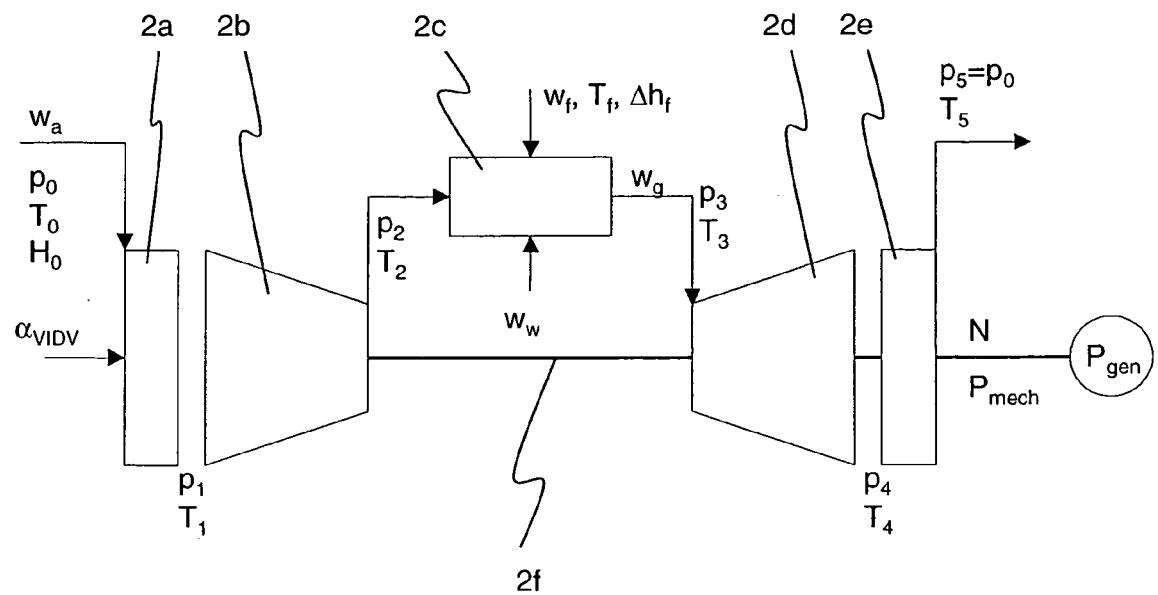
FIG. 1 schematically shows the components of a gas turbine.

FIG. 1 shows the principal components of a gas turbine and the places where the various input and output variables are measured. The gas turbine is viewed as a system which consists of a sequence of ideal volume elements in thermodynamic equilibrium, i.e. compressor inlet $2a$ (filter, nozzle), compressor $2b$, combustion chamber $2c$, turbine $2d$ and outlet conduit $2e$, wherein compressor $2b$ and turbine $2d$ are mechanically interconnected by a shaft $2f$. A flow $w_a$ of ambient air at temperature $T_0$, pressure $p_0$ and relative humidity $H_0$ enters the compressor inlet $2a$ through inlet guide vanes characterized by the variable angle $\alpha_{VIGV}$. Compressor inlet and outlet temperature and pressure are denoted $T_1$, $p_1$ and $T_2$, $p_2$, respectively. A fuel mass flow $w_f$ of temperature $T_f$ and fuel heat value $\Delta h_f$, as well as a water mass flow $w_w$ are injected to the combustion chamber $2c$. A turbine inlet gas flow $w_g$ enters the turbine $2d$ at a turbine inlet pressure $p_3$ and temperature $T_3$. Turbine outlet pressure and temperature are denoted $p_4$ and $T_4$, whereas the exhaust gas finally has a temperature $T_5$ and a pressure $p_5$ assumed equal to $p_0$. The shaft speed N, mechanical power $P_{mech}$ and generator power $P_{gen}$ are typical output variables, whereas the ambient parameters $T_0$, $p_0$, $H_0$ and the regulated quantities $w_f$, $w_w$, $\alpha_{VIGV}$ are typical input variables.

System models of gas turbines replicate the thermodynamic and aerodynamic operating behaviour of the gas turbine and include the laws of conservation of energy and mass, enthalpy considerations as well as turbine and compressor maps provided by the manufacturer. The health or degradation of a compressor or a turbine is usually described by a polytropic efficiency $\eta_\infty$ a flow capacity $m\sqrt{T_{IN}}/p_{IN}$, where m is the flow and $T_{IN}$ and $p_{IN}$ are the inlet temperature and pressure of the device, respectively, and where the efficiencies actually may be factors multiplying a power-dependent reference, nominal or initial efficiency. Accordingly, common equipment faults of a gas turbine may be represented by deviations of so-called health parameters from the values of a new-and-clean state. In what follows, an illustrative example including these four standard degradation symptoms or health parameters is considered, thereby disregarding e.g. the effective area of an inlet filter. The named four health parameters, i.e. compressor flow capacity, polytropic compressor efficiency, turbine flow capacity, and polytropic turbine efficiency are grouped as the elements of a vector p of independent parameters. As mentioned before, these four health parameters cannot be measured directly during operation of the real plant; they are "hidden" symptoms that have to be derived or reconstructed from the overall plant measurements.

Figure 2:
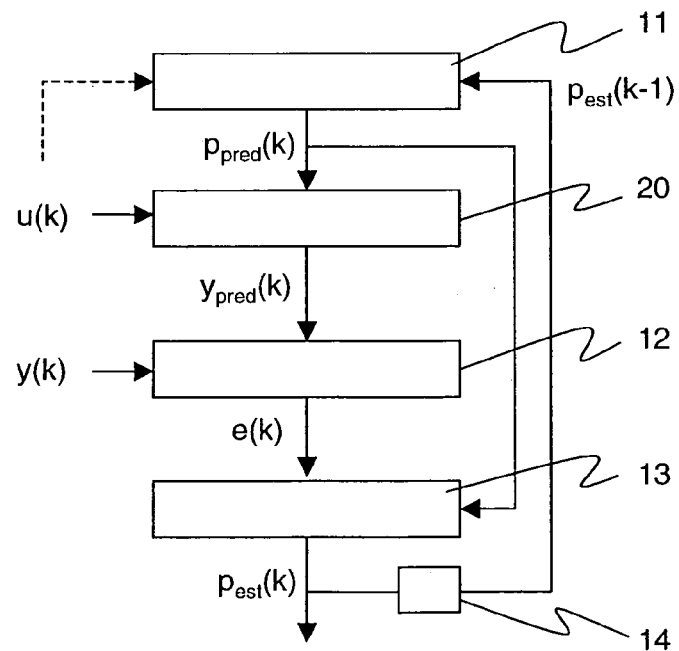
FIG. 2 is a flow chart of the process of updating a health parameter.

FIG. 2 depicts a flow chart of the model-based process of assessing the health parameter degradation according to the invention. As set out above, the health states represented by the vector p of independent parameters are linked through a thermodynamic model of the gas turbine to input variables u (ambient conditions as well as regulated quantities or manipulated variables such as the angle of the variable inlet guide vanes and the fuel mass flow) and dependent output variables y (internal process variables such as temperatures, pressures, power, shaft speed). An estimation or approximate reconstruction of the true health or independent parameter vector p(k) at time k uses the estimate $p_{est}(k-1)$ of the true health or parameter vector p(k−1) at the previous time step k−1 as a starting value. Based on this estimate, a health parameter predictor 11 produces a predicted health parameter $p_{pred}(k)$ as detailed further below. An extended model 20 of the system yields a predicted model output $y_{pred}(k)$ based on the predicted health parameter $p_{pred}(k)$ and a set of measured input values u(k). The predicted model output $y_{pred}(k)$ is compared with a measured dependent vector y(k) in a comparator 12 to yield an error e(k). From the error e(k), a health parameter estimator 13 in turn produces a health parameter estimate $p_{est}(k)$ as a revision of the predicted health parameter $p_{pred}(k)$. This estimate $p_{est}(k)$ is associated with the unknown true value of the independent parameter vector p(k) at time k. The time delay element 14 is stores the actual estimate $p_{est}(k)$ and provides it to the predictor 11 as the previous estimate as soon as updated measured values are available at time k+1.

The proposed method is based on the assumption that an adequately adapted average update interval, i.e. a time delay D=t(k)−t(k−1) between two successive executions being well below the characteristic deterioration times τ, prevents excessive shifts in the parameters. In the case of gas turbines, the expected degradation rates of the health parameters are of the order of weeks or months, such that a time delay of the order of minutes appears to be adequate. More frequent updates could not be expected to yield any additional information, whereas with longer update intervals the advantage of starting with the previous estimate $p_{est}(k-1)$, instead of any "universal" baseline related to a standard or non-deteriorated state, would gradually disappear.

As indicated by the dashed line in FIG. 2, input variables u, and among these in particular the regulated quantities, may be taken into account for the prediction of the health parameters. Thus, the knowledge about e.g. a changing angle of the variable inlet guide vanes can be included already when predicting the parameters rather than when revising the prediction via the measured output variables y being affected by the former.

Figure 3:
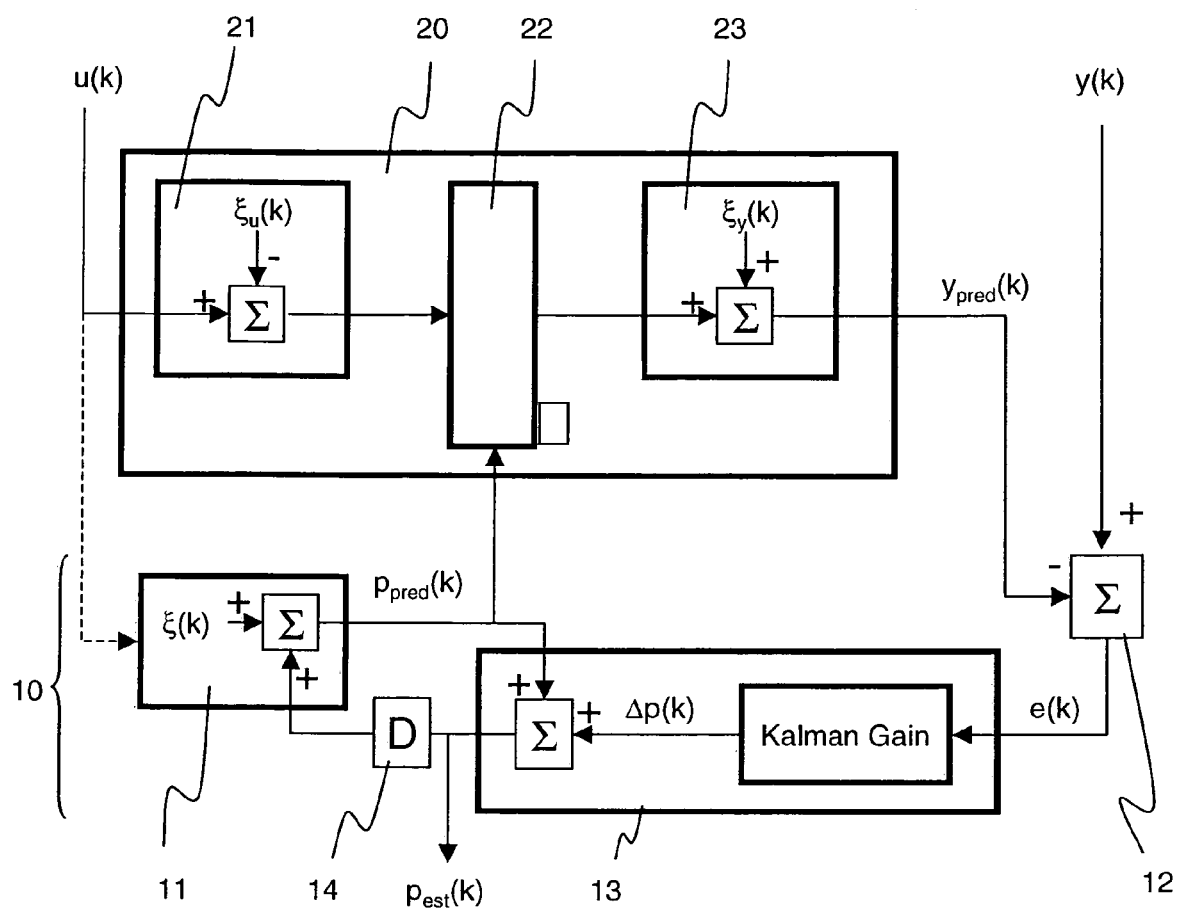
FIG. 3 depicts the process of updating a health parameter by means of a Kalman Filter.

The tracking of the degradation symptoms, i.e. the repeated identification of the health parameters, is done via a Recursive Least Squares algorithm (RLS), or preferably via a specific discrete-time Kalman Filter (KF). FIG. 3 represents a graphical view of the use of the specific Kalman Filter, including a dynamic evolution model 10 of the health degradation parameters p, including the aforementioned predictor 11, comparator 12, estimator 13 and delay element 14, and an extended system model 20 including an inverse input sensor model 21, a thermodynamic model of the gas turbine 22, and an output sensor model 23 for predicting a vector $y_{pred}(k)$ of model outputs.

In the case of an industrial gas turbine, the thermodynamic model 22 preferably describes the gas turbine in a steady-state phase, i.e. transient phases between two operating points or a frequency-response operation mode are not considered. The only dynamic aspect is the parameter evolution as described in the predictor 11.

As set out above, at each time step k, the estimate $p_{est}(k-1)$ obtained at the previous execution is taken as a starting value for the prediction, which optionally includes the current values u(k) of the input variables as indicated by the dashed line, of the predicted health parameter $p_{pred}(k)$. The latter in turn is fed into the thermodynamic model of the gas turbine 22 to yield a prediction of model outputs $y_{pred}(k)$ corresponding e.g. to measurements of output variables along the gas path. The difference e(k) between these predicted model outputs $y_{pred}(k)$ and the true measurements y(k) is combined with a Kalman Gain K(k) by matrix-vector multiplication to yield the update term $\Delta p(k)=K(k)\cdot e(k)$. The update term $\Delta p(k)$ finally is added as a revision to the predicted parameter vector $p_{pred}(k)$ to form the estimate $p_{est}(k)$ of the health parameters p(k) as a reconstruction of the degradation symptoms of the gas turbine.

In standard Kalman Filter terminology, the prediction of states p and model outputs y is done via two functions denoted f and h that can be assigned to the predictor 11 and the extended system model 20, respectively, and can be formulated as $$p_{pred}(k)=f(p_{est}(k-1), u(k))$$

$$y_{pred}(k)=h(p_{pred}(k), u(k))$$

In a general way, the Kalman Filter takes uncertainties in the initial state estimation, in the dynamic evolution of the states, and in the measurements into account. In the context of the present invention, the health parameters take the role of the states, and the uncertainty results from offsets, drifts and stochastic effects of the physical sensors that determine the values u(k), y(k) of the input and output variables. Likewise, the step of passing from the previous estimation $p_{est}(k-1)$ to the current prediction $p_{pred}(k)$ may comprise an inherent degree of uncertainty, which however the present invention is able to handle as detailed below. To this purpose, the input and output variables, as well as the health parameters, will be considered as vectors of distributed quantities with a mean vector and a covariance matrix from here on.

FIG. 3 depicts the background or motivation for including the sensor noise that inevitably accompanies the measured values of the input and output variables. The measured value u(k) as determined by a physical input-sensor is treated according to the input-sensor model 21 which acts as an inverse sensor model. This model subtracts an assumed input-sensor noise $\xi_u(k)$, approximating offset, drift and stochastic characteristics of the input-sensor, from the measured value u(k) to yield a corresponding internal state. The latter is considered error-free and fed into the thermodynamic model 22, which in turn processes exclusively mean values. Correspondingly, the resulting internal state, likewise considered error-free, is treated according to the output-sensor model 23, which adds an assumed output-sensor noise $\xi_y(k)$ to yield the predicted model output $y_{pred}(k)$. The latter then is compared with the measured value y(k) as determined by a physical output-sensor, the offset, drift and stochastic characteristics of which is being approximated by the assumed output-sensor noise $\xi_y(k)$. In Kalman Filter terminology, the negative input sensor noise $\xi_u(k)$ refers to process noise, whereas the output sensor noise $\xi_y(k)$ is known as measurement noise. Both process noise $\xi_u(k)$ and measurement noise $\xi_y(k)$ are each described by a mean vector comprising as many elements as there are input and output variables, respectively, and generally equaling zero. In addition, the respective covariance matrices Q and R even allow taking into account a mutual correlation between the respective sensor noise terms. In the Kalman Filter according to FIG. 3, process and measurement noise are the basis of the calculation of the Kalman Gain K(k) as part of the parameter evolution model 10.

At predictor 11, mean value and variance of the latest estimation $p_{est}(k-1)$ are updated to handle any offset, drift and stochastic uncertainty connected to the step of passing from the previous estimation $p_{est}(k-1)$ to the current prediction $p_{pred}(k)$. To that purpose, a generalized process noise $\xi_p(k)$, described by a mean vector with as many elements as there are health parameters, as well as by a corresponding covariance matrix $Q_{pp}$, is added to the former. This generalized process noise is also included in the calculation of the Kalman Gain K(k). Using the covariance matrices mentioned, and in addition to the estimation $p_{est}(k)$ of the health parameters, the Kalman Filter delivers as well the covariance matrix $P_{pp}(k)$ indicative of the estimation error, i.e. describing the uncertainty in the estimation $p_{est}(k)$.

The covariance matrix $Q_{pp}$ of the generalized process noise $\xi_p(k)$ represents e.g. the increasing uncertainty resulting from a longer than usual delay or update time D, its elements may typically vary between $10^{-10}$ and $10^{-5}$ in relative units. A priori knowledge about the health parameter changes, such as speed of condition degradation of a particular gas turbine or the scheduling of maintenance actions, can be included through the specification of the statistics of $\xi_p(k)$. As a finite degradation speed is reflected by a mean value of the generalized process noise $\xi_p(k)$ different from zero, a maintenance effect at time k can be modelled by a corresponding modification of the mean of $\xi_p(k)$, or randomly occurring damages can be modelled by adding an offset to $\xi_p(k)$.

The proposed health parameter estimation setup may be advantageously used in the context of the following embodiments directed to an on-line or off-line analysis for condition monitoring.

Figure 4:
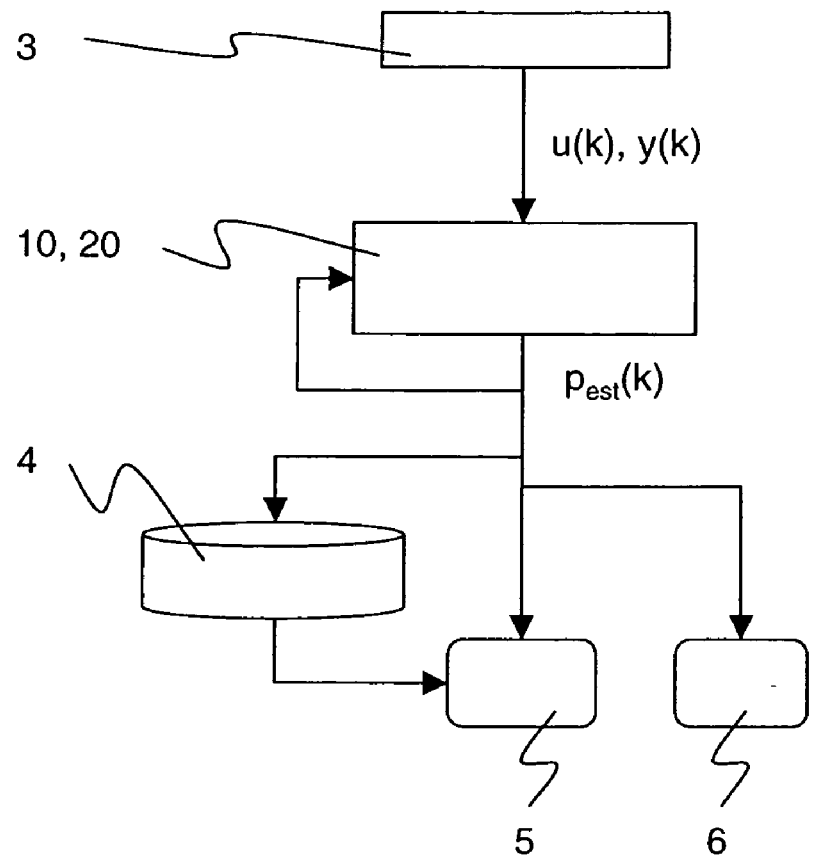
FIG. 4 shows the on-line application of the above process.

FIG. 4 shows the on-line approach, where the system continuously tries to identify the latest evolution of the different degradation symptoms. As new measurements u(k), y(k) are provided at time k, e.g. by a distributed control system 3, the dynamic evolution model 10 and the extended system model 20 are recomputed as detailed above. This provides a new estimate $p_{est}(k)$ of the current value of the health parameters, which is stored in a database 4, used to update a trend display 5, or fed to a diagnosis tool 6 for the purpose of diagnosing an underlying fault.

Figure 5:
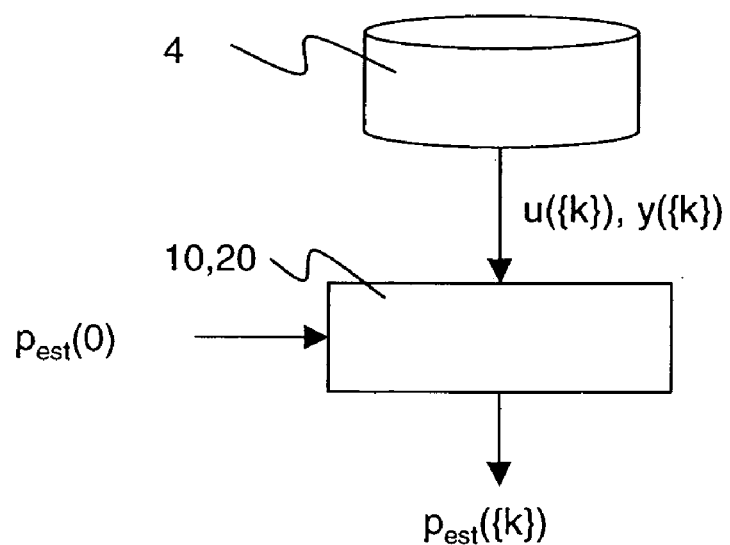
FIG. 5 shows the off-line application of the above process.

FIG. 5 shows the setup for an off-line or post-mortem analysis. A batch of historical system data comprising values u({k}), y({k}) of the various output and input parameters measured at a plurality of discrete time steps {k}, is stored in a database 4 and made available to the estimator 13. Given a reliable starting point in the form of an initial estimation $p_{est}(0)$ and assumptions about sensor noise or drift, the system estimates a sequence $p_{est}(\{k\})$ of health parameters, thus reconstructing the past evolution of the different degradation symptoms.

Figure 6:
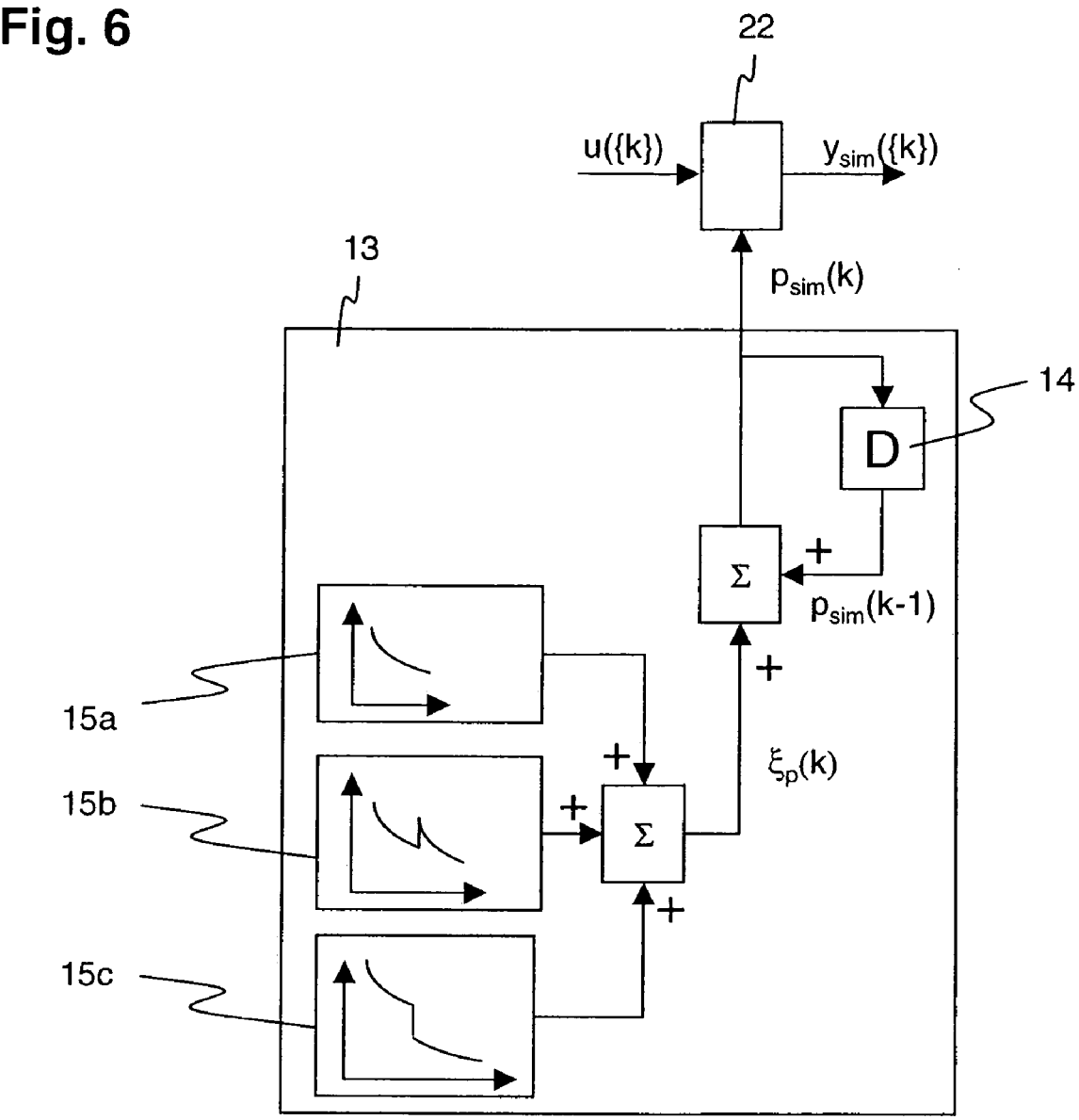
FIG. 6 depicts a simulation approach based on a dynamic evolution model.

If appropriate assumptions about the evolution of the various factors influencing on the generalized process noise $\xi_p(k)$ are made, the proposed health parameter predictor 11 as part of the dynamic evolution model can also be used for simulating a simultaneous degradation of different and possibly coupled health parameters. As above, the elements of the generalized process noise $\xi_p(k)$ describe the change of the corresponding elements of the health parameter vector. Such a change or update is random and assumed independent of the current state and composed of various stochastic contributions 15a, 15b, 15c as schematically depicted in FIG. 6. Degradation effects, which result in a gradual decrease in efficiency and flow capacity are modelled by a uniformly distributed drift. The mean of this first stochastic contribution is preferably exponential in time. In a second stochastic contribution, a maintenance schedule set up according to the operational constraints results in a recovery in efficiency and flow capacity. In a third stochastic contribution, randomly occurring damage effects resulting in a step-like decrease in efficiency are modelled for instance as a Poisson distribution. The generalized process noise $\xi_p(k)$ is the sum of all these components, which determines the evolution of the vector of simulated parameters $p_{sim}(k)$ as indicated. The arbitrary time delay element D denotes the time-discrete character of this process that as a matter of fact corresponds to a short-circuited estimator 13, where the estimated values are identified with the predicted values without any revision at all.

Figure 7:
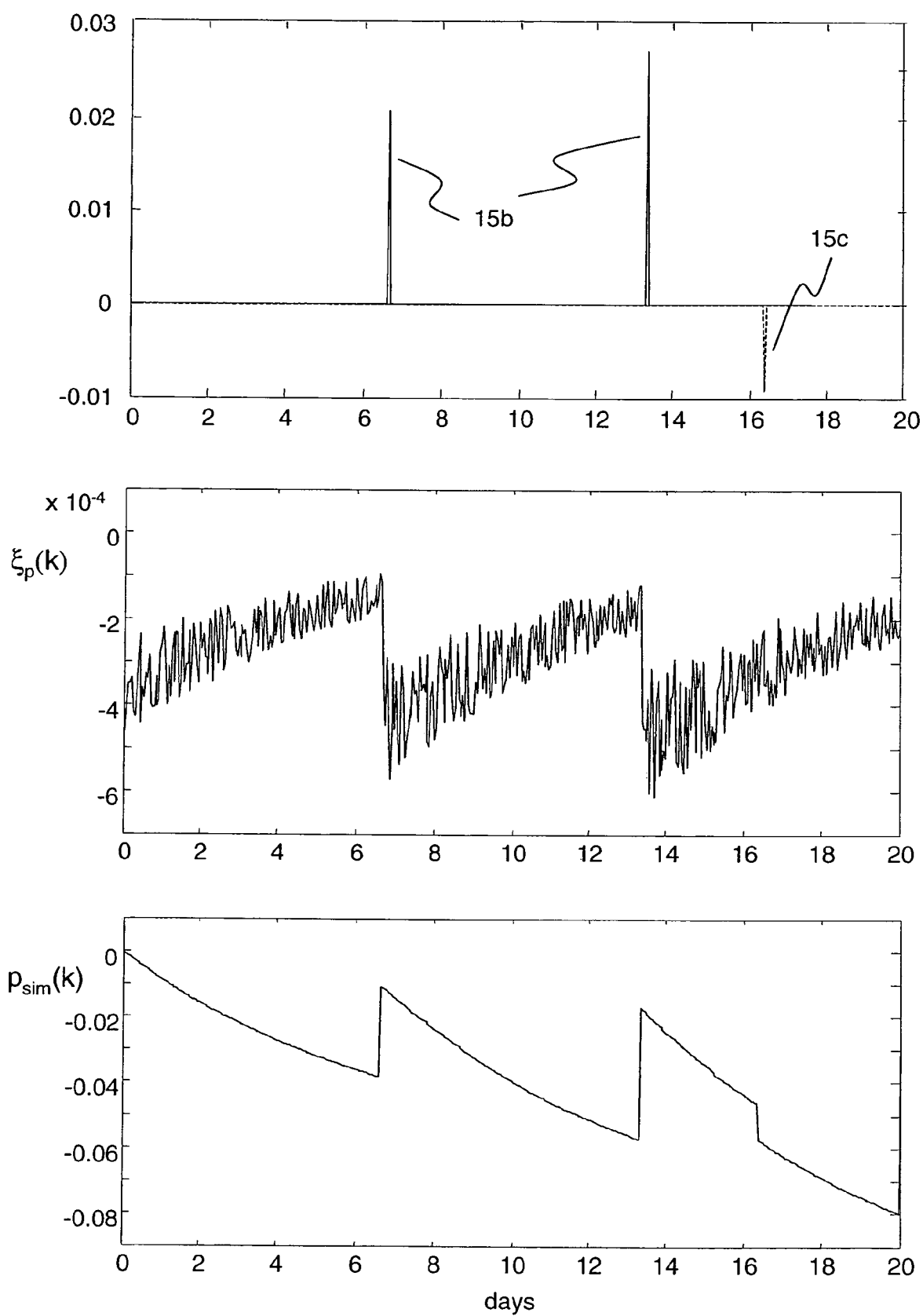
FIG. 7 shows three graphs that chart the results of a simulation.

FIG. 7 finally shows the details of such a simulation over a time period of 20 days. The topmost graph depicts, in relative units, two discrete maintenance effects 15b after 6 and 13 days as well as a singular damage event 15c (dashed line) after 16 days. On the second graph, a generalized process noise $\xi_p(k)$ is displayed, resulting from the aforementioned contributions 15b, 15c as well as a continuous degradation modelled by a uniformly distributed drift and simulated once per hour. The third graph shows the evolution of simulated parameters $p_{sim}(k)$.

This procedure of simulating the health parameters can further be extended to simulate other aspects of the system behaviour. In a training environment, the simulated parameters $p_{sim}(k)$ are fed into the system model 22 together with a batch of historical system data of measured input values u({k}) to produce simulated output values $y_{sim}(\{k\})$. The latter are then compared with measured output values, and the initial health parameter simulation, and the assumptions about the generalized process noise $\xi_p(k)$ in particular, can be tuned or trained. In a test schedule environment, the parameters $p_{sim}(k)$ simulated according to a particular schedule of maintenance decisions, together with a batch of input values u({k}), are used to simulate a system performance or another element of the output vector y. Accordingly, a plurality of health parameter degradation scenarios can be produced and evaluated for comparative purposes.

While the preferred embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

List of Designations
2a inlet
2b compressor
2c combustion chamber
2d turbine
2e outlet conduit
2f shaft
10 dynamic evolution model
11 health parameter predictor
12 comparator
13 health parameter estimator
14 delay element
15 stochastic contribution
20 extended system model
21 input sensor model
22 thermodynamic model of the gas turbine
23 output sensor model
3 distributed control system
4 database
5 trend display
6 diagnosis tool

The invention claimed is:

1. A method of estimating health parameters p(k) representing symptoms of a slowly degrading system that includes at least turbomachines and internal combustion engines at a discrete time k, the method begin executed in a processing system having a specific discrete-time Kalman filter having a dynamic evolution model and an extended system model, the method comprising
a) providing, in the Kalman filter, a prediction Ppred(l) of the health parameters p(k),
b) calculating, in the Kalman filter, a prediction Ypred(k) of output variables y of a model of the system, based on a prediction Ppred(k) of the health parameters and measurements u(k) of input variables u of the model measured at time k,
c) establishing, in the Kalman filter, a difference e(k) between the prediction Yprep(k) of the output variables y and measurements y(k) of the output variables y measured at time k,
d) calculating, in the Kalman filter, an estimate Pest(k) of the health parameters p(kl) based on the prediction Ppred(k) of health parameters P(k) and the difference e(k), wherein step a) comprises providing a prediction Ppred(k) of health parameters p(k) based on an estimate Pest (k−1) of the health parameters p(k−1) at a previous time k−1, wherein an interval D between the time k and the previous time k−1 is smaller than a characteristic degradation time τ of the degrading system, and
e) simulating a system performance based on the prediction $P_{pred}(k)$ of the health parameters p(k) to produce simulated output values ysim({k}).

2. The method according to claim 1, wherein step a) comprises providing the prediction Ppred(k) based on generalized process noise ξ(k) representing stochastic uncertainty and/or a-priori knowledge of an evolution of the health parameters p(k).

3. The method according to claim 1, wherein step a) comprises providing the prediction Ppred(k) based on the measurements u(k) of the input variables u measured at time k.

4. The method according to claim 1, wherein step b) comprises calculating a prediction Ypred(k) of output variables y based on output-sensor noise ξy(k) representing offset, drift and/or stochastic characteristics of an output-sensor providing the measurements y(k) of the output variables y at time k.

5. The method according to claim 2, wherein steps a) to d) are performed by a specific discrete-time Kalman Filter comprising a dynamic evolution model and an extended system model, and including a Kalman Gain K(k) based on the generalized process noise ξ(k) or the output-sensor noise ξy(k).

6. The method according to claim 1, wherein the method is used for estimating health parameters p(k) representing symptoms of an industrial gas turbine.

7. The method according to claim 1, wherein the steps a) to d) are executed intermittently after the lapse of an update interval D to produce a current estimate Pest(k) of the current value of the health parameters p(k) based on current measurements u(k), y(k) of the input and output variables u, y, or repeatedly to produce a series of estimates (Pesk{k} based on historical batch data comprising values u({k}), y({k}) of the input and output variables u, y measured at a plurality of discrete time steps {k}.

8. A computer readable medium that stores a computer program for estimating or simulating health parameters p(k) representing symptoms of a slowly degrading system at a discrete time k, the computer program comprising computer program code means to make, when the computer program is loaded in an internal memory of a digital computer, said computer being configured to execute a method of estimating health parameters p(k) representing symptoms of a slowly degrading system at a discrete time k, the method begin executed in a processing system having a specific discrete-time Kalman filter having a dynamic evolution model and an extended system model, the method comprising
  a) providing, in the Kalman filter, a prediction Ppred(l) of the health parameters p(k),
  b) calculating, in the Kalman filter, a prediction Ypred(k) of output variables y of a model of the system, based on a prediction Ppred(k) of the health parameters and measurements u(k) of input variables u of the model measured at time k,
  c) establishing, in the Kalman filter, a difference e(k) between the prediction Yprep(k) of the output variables y and measurements y(k) of the output variables y measured at time k,
  d) calculating, in the Kalman filter, an estimate Pest(k) of the health parameters p(k1) based on the prediction Ppred(k) of health parameters P(k) and the difference e(k), wherein step a) comprises providing a prediction Ppred(k) of health parameters p(k) based on an estimate Pest(k−1) of the health parameters p(k−1) at a previous time k−1, wherein an interval D between the time k and the previous time k−1 is smaller than a characteristic degradation time τ of the degrading system, and
  e) simulating a system performance based on the prediction $P_{pred}$(k) of the health parameters p(k) to produce simulated output values ysim({k}).

9. The method according to claim 4, wherein steps a) to d) are performed by a Kalman Filter comprising a dynamic evolution model and an extended system model, and including a Kalman Gain K(k) based on the generalized process noise (k) or the output-sensor noise y(k).

10. A health parameter estimator for estimating health parameters p(k) representing symptoms of a degrading system at a discrete time k, comprising
  a) a health parameter predictor providing a prediction $P_{pred}$(k) of the health parameters p(k),
  b) an extended system model for calculating a prediction $Y_{pred}$(k) of output variables y of the model, based on the prediction $P_{pred}$(k) of the health parameters and measurements u(k) of input variables u of the model measured at time k,
  c) a comparator for establishing a difference e(k) between the prediction $y_{pred}$(k) of the output variables y and measurements y(k) of the output variables y measured at time k,
  d) a health parameter estimator for calculating an estimate $P_{est}$(k) of the health parameters p1(k) based on the prediction $P_{pred}$(k) of the health parameters p(k) and the difference e(k),
  wherein the health parameter predictor is adapted to provide a prediction $P_{pred}$(k) of the health parameters p(k) based on an estimate $P_{est}$(k−1) of the health parameters p(k−1) at a previous time k−1, wherein an interval D between the time k and the previous time k−1 is smaller than a characteristic degradation time τ of the degrading system and wherein components a) to d) utilize a specific discrete-time Kalman Filter having a dynamic evolution model and an extended system model, and a health parameter simulator that simulates a system performance based on the prediction $p_{pred}$(k) of the health parameters p(k) to produce simulated output values ysim({k}).

11. The health parameter estimator according to claim 7, characterized in that it comprises a specific discrete-time Kalman Filter comprising the extended system model and a dynamic evolution model including said predictor, comparator, estimator as well as a delay element, and comprising a Kalman gain K(k) based on a generalized process noise ξ (k) representing stochastic uncertainty and/or a priori knowledge of an evolution of the health parameters p(k) or based on output-sensor providing the measurements y(k) of the output variables y at time k.

* * * * *